Nov. 20, 1945.  R. W. ANDREASSON  2,389,401
MECHANISM FOR RELIEVING THE TEETH
OF CIRCULAR CUTTING ELEMENTS
Filed Dec. 17, 1942  3 Sheets-Sheet 1

INVENTOR
Rudolf W. Andreasson.
BY
Harness, Dickey & Pierce.
ATTORNEYS.

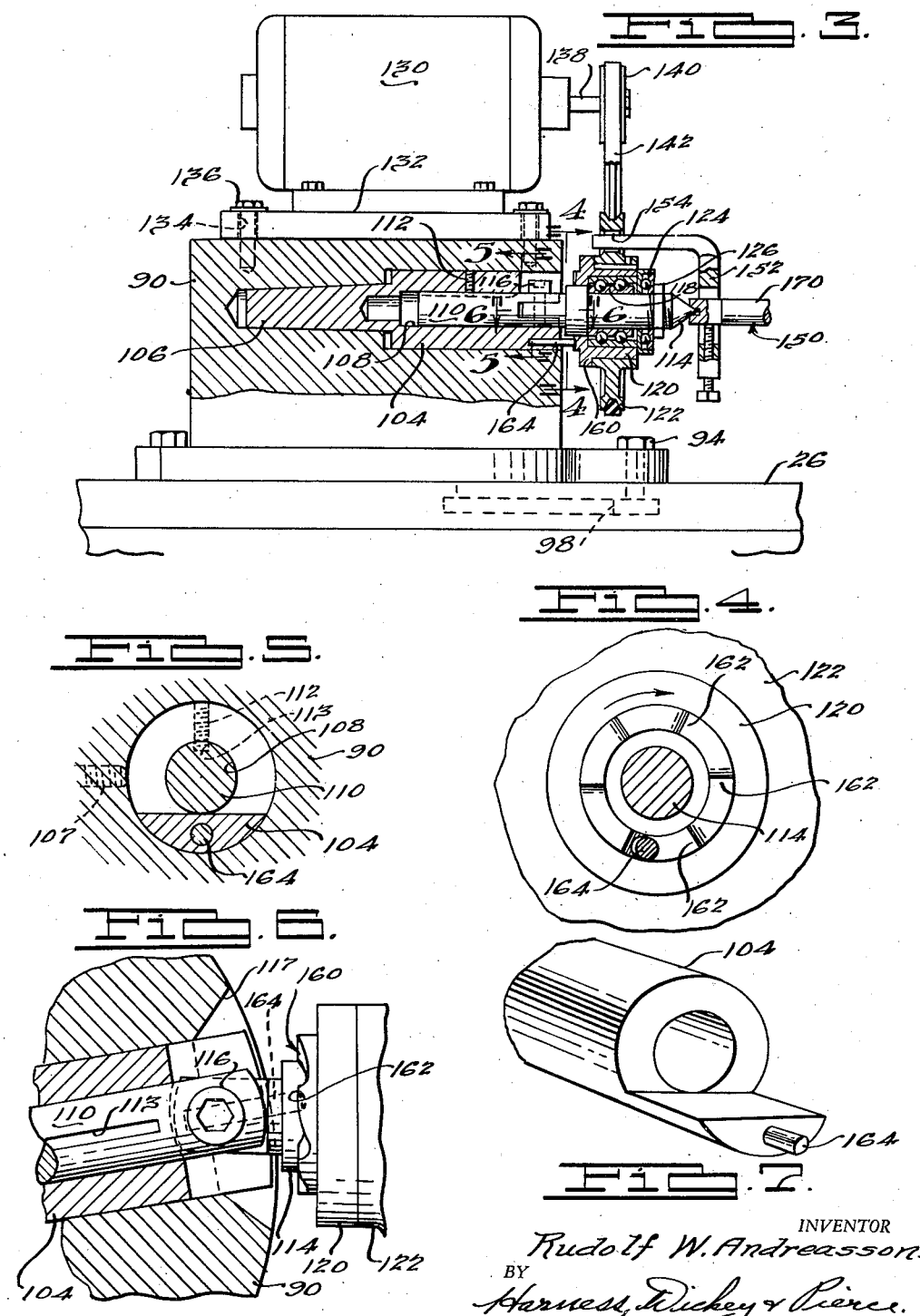

Nov. 20, 1945. R. W. ANDREASSON 2,389,401
MECHANISM FOR RELIEVING THE TEETH
OF CIRCULAR CUTTING ELEMENTS
Filed Dec. 17, 1942 3 Sheets-Sheet 3
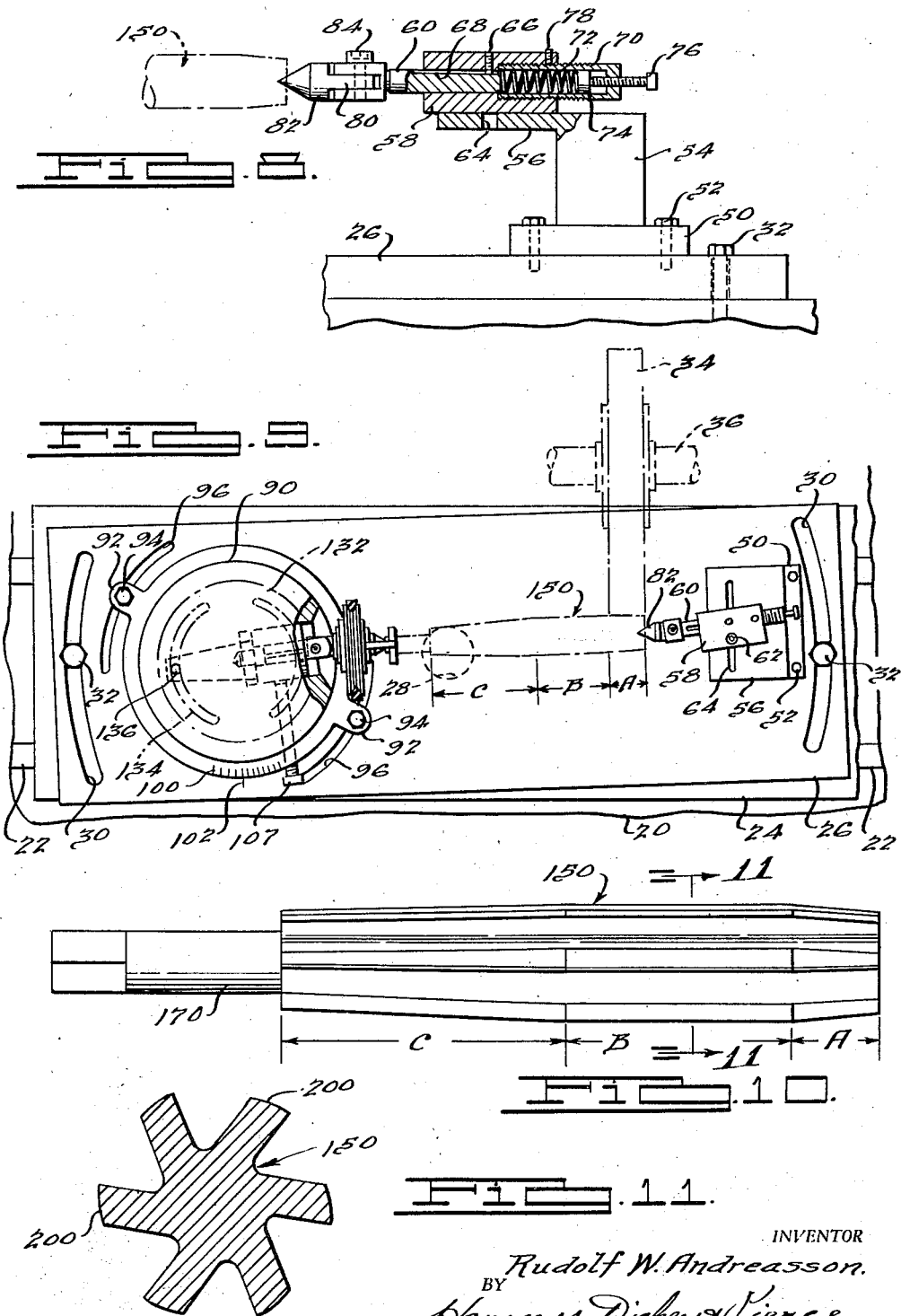
INVENTOR
Rudolf W. Andreasson.
BY
Harness, Dickey & Pierce.
ATTORNEYS.

Patented Nov. 20, 1945

2,389,401

UNITED STATES PATENT OFFICE 2,389,401

MECHANISM FOR RELIEVING THE TEETH OF CIRCULAR CUTTING ELEMENTS

Rudolf W. Andreasson, Detroit, Mich.

Application December 17, 1942, Serial No. 469,368

6 Claims. (Cl. 51—95)

This invention relates to a method of relieving or backing off the lands back of the cutting edges of the teeth of circular rotating types of cutting elements, such as reamers, milling cutters or the like, and to mechanism for carrying out such method, the principal object being the provision of a new and novel method by means of which such lands may be circularly or otherwise backed off in a quick, efficient and accurate manner, as well as to a simplified form of mechanism for carrying out the method.

Objects of the invention include the provision of a method of backing off the lands following the cutting teeth of circular, rotating types of cutting elements comprising the steps of bodily reciprocating the work, when in contact with a cutting element, in a direction disposed at an acute angle with respect to the line of contact between the work and the cutting element; the provision of a method as above described in which the cutting element is an abrading element, such as a grinding wheel; the provision of a method as above described in which the reciprocation of the workpiece in opposite directions occurs during rotation of the workpiece; the provision of a method as above described in which the workpiece is reciprocated in one direction as each tooth of the workpiece is presented in turn to the abrading element; the provision of a method as above described in which the reciprocation of the workpiece at an angle to the line of contact between the work and the abrading element or other cutting element occurs while the workpiece is being bodily moved in a direction parallel to such line of contact; the provision of a method as above described in which the amount of reciprocation of the workpiece at an angle to the line of contact between the work and the cutting element may be varied to obtain any desired cross-sectional curvature of the backed off surface; the provision of a method of backing off the teeth of circular cutting elements as above described in which the amount of backoff may be varied either by varying the amount of reciprocation of the workpiece at an angle to the line of contact between the work and cutting element, by varying the angle along which the reciprocation occurs with respect to such line of contact, or by a combination of both; and the provision of a method of backing off the teeth of circular cutting elements that is simple, quick and efficient.

Other objects of the invention include the provision of mechanism for backing off teeth of circular cutting elements in accordance with the above described method including means for presenting a workpiece in the form of a circular toothed rotatable cutting tool to a rotating abrading element so that the contact between them will be line contact, together with means for effecting bodily shiftable movement of the workpiece, while in contact with the abrading element, at an acute angle with respect to said line of contact.

The above being among the objects of the present invention the same consists in certain steps or combinations of steps of operation and in certain novel features of construction and combinations of parts to be hereinafter described with reference to the accompanying drawings, and then claimed, having the above and other objects in view.

In the accompanying drawings which illustrate a suitable embodiment of apparatus constituting a part of the present invention and which is capable of carrying out the method of the present invention, and in which like numerals refer to like parts throughout the several different views, Fig. 1 is a front elevational view of a grinding machine provided with a work supporting and driving mechanism in accordance with the present invention;

Fig. 3 is an enlarged partially broken, partially sectioned side elevational view of the driving head or head stock employed on the grinding machine shown in the preceding views, the section being taken vertically thereof as on the line 3—3 of Fig. 2;

Fig. 4 is an enlarged, fragmentary, vertical sectional view taken on the line 4—4 of Fig. 3 and particularly illustrating the construction of the cam employed for effecting reciprocation of the work;

Fig. 5 is an enlarged, fragmentary, vertical sectional view taken on the line 5—5 of Fig. 3;

Fig. 6 is an enlarged, fragmentary, horizontal sectional view taken on the line 6—6 of Fig. 3 to better illustrate the pivotal mounting of the center point at the driving end of the mechanism and the relation of the cam shown in Fig. 4 thereto and to the associated structure;

Fig. 7 is a fragmentary perspective view illustrating the formation of the end of the holder for the reciprocating center in the driving head or head stock;

Fig. 8 is an enlarged, fragmentary, vertical sectional view taken on the line 8—8 of Fig. 2 and illustrating the details of the tail stock and its cooperating center;

Fig. 9 is a view similar to Fig. 2 but illustrating the manner in which the head and tail stocks are adjusted through adjustment of the swinging upper table of the grinder to back off the teeth of a workpiece when the cutting edges of such teeth are not in parallel relation to the axis of the workpiece;

Fig. 10 is a side elevational view of a reamer which may be backed off by the mechanism shown in the preceding views; and, Fig. 11 is an enlarged transverse sectional view taken on the line 11—11 of Fig. 10 but illustrating an exaggerated amount of back off for the purpose of explanation.

Figure 1:
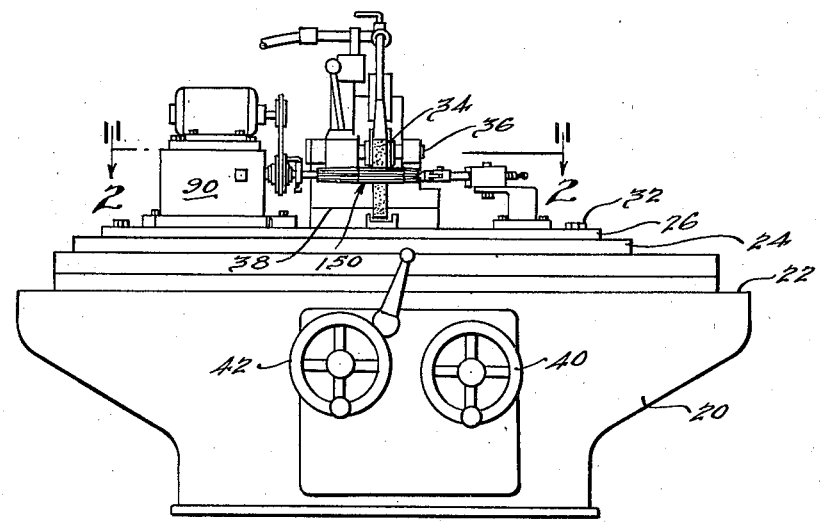

The present invention is applicable for use in the manufacture of any circular cutting tool having a plurality of teeth arranged around the axis thereof and extending in parallel relation with respect to such axis. Such class of tools includes reamers, milling cutters, circular saws or the like but, inasmuch as the present invention is particularly valuable in the manufacture of reamers, reference herein will be made mainly to reamers and those skilled in the art will thereby recognize the application of the invention to other tools of such class.

In accordance with the method of the present invention the work, in other words the reamer, may be mounted and supported for bodily movement across the face of a grinding wheel in the same general manner as any piece of work in a cylindrical external grinder. In this case, however, the supporting means for the reamer is so constructed and arranged that the reamer, during its bodily movement across the wheels, has additionally imparted to it a bodily reciprocatory movement, not necessarily about its axis but in a direction disposed at an acute angle to the line of contact between the reamer and the grinding wheel measured in a plane including the axis of the reamer and the line of contact between the reamer and the grinding wheel. It will be appreciated that because of such reciprocable movement of the reamer at an angle to the line of contact between the reamer and the grinding wheel the reamer is caused to move bodily toward and from the grinding wheel due to such reciprocatory movement and it is this last-mentioned bodily movement that is utilized to remove metal from the reamer during the backing off operation. The reamer is, of course, rotated during its bodily movement past the grinding wheel and the reciprocatory movements thereof are so related to the teeth on the reamer as to remove the desired amount of metal at the location required in the backing off operation.

While it is believed obvious to those skilled in the art that once the principles of the present invention are understood by one skilled in the art various types of mechanism may be provided to provide the desired correlated movement of the reamer with respect to the grinding wheel during the backing off operation, the particular embodiment which is illustrated in the drawings and constituting a further phase of the present invention is one which permits a conventional cylindrical grinder to be quickly and readily adapted for carrying out the method of the present invention and will permit its re-conditioning for simple cylindrical grinding operations in a quick, ready and efficient manner. Preferably such apparatus is adapted for use on a conventional universal cylindrical grinder for the reason that in such case reamers having a frusto-conical lead end or other non-cylindrical portion may have the teeth thereof backed off over such portion on the same grinder as is employed for backing off that portion of the length of the teeth within a truly cylindrical portion thereof. By its use the lands of a reamer may be backed off circularly or to any other desired cross-sectional configuration depending upon the contour imparted to the actuating cam.

Figure 2:
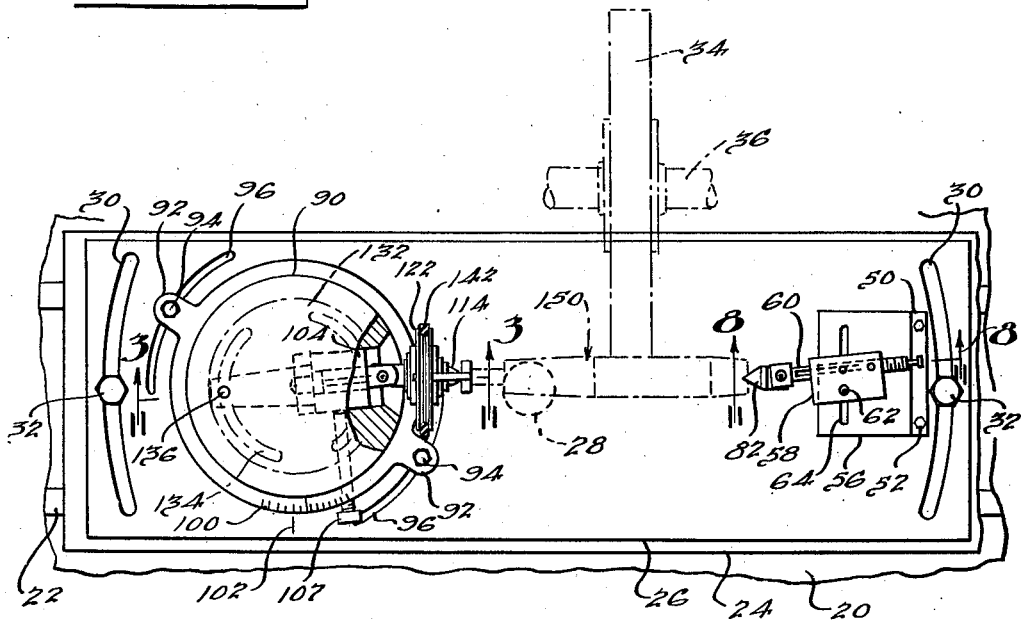
Fig. 2 is an enlarged, fragmentary, partially broken, partially sectioned plan view of the grinding machine shown in Fig. 1 and taken as on the line 2—2 thereof.

Referring now to the accompanying drawings and particularly to Fig. 1, a conventional form of so-called universal cylindrical grinder is shown as including a base 20 provided with ways 22 upon its upper surface upon which a table 24 is reciprocably mounted and driven in a conventional manner. Upon the table 24 is a second table 26 which as best brought out in Fig. 2 is pivoted to the table 24 by means of a pin or stud 28 for movement in a horizontal plane about the axis of the pin or stud 28. The table 26 is provided with an arcuate slot 30 adjacent each end thereof, struck from the center of the pin 28, through which projects a clamping screw 32 which threads into the table 24 for the purpose of locking the table 26 in adjusted position about the axis of the pin 28 upon the table 24. In Fig. 2 the table 26 is shown as being longitudinally aligned with the table 24, this being the relation of the two tables where a true cylindrical grinding operation is to be effected. If a conical or frusto-conical part is to be ground, then according to conventional practice it is mounted between centers positioned centrally of the table 26 and the table 26 is swung about the pin 28 to bring the line of contact between the conical part and the grinding wheel into parallelism with respect to the path of movement of the table 24 on the ways 22. A grinding wheel 34 is mounted upon a shaft 36 at the back side of the machine and the axis of the shaft 36 is arranged in parallelism with the ways 22. The shaft 36 is rotatably supported upon a suitable slide 38 which is mounted for movement in a horizontal plane in a direction perpendicular to the length of the ways 22 so as to permit the grinding wheel 34 to be moved toward or away from the work supported on the table 26. A conventional control handle 40 is shown provided for controlling the movement of the slide 38 and consequently the grinding wheel 34 toward and from the work and a conventional wheel 42 is provided for effecting movement of the table 24 and, therefore, the table 26 and the work carried by it longitudinally of the ways 22.

In accordance with this phase of the present invention the usual driving head or head stock and tail stock conventionally employed on such grinders is replaced by a driving head or head stock and a tail stock of the following description. The tail stock, as best brought out in Figs. 2, 8, and 9 comprises a supporting part consisting of a base 50 suitably secured in flat contacting relation with respect to the upper face of the table 26 adjacent one end thereof as by means of screws 52. The base 50 has integrally formed therewith an upstanding pedestal portion 54 which terminates at its upper end in an overhanging plate-like portion 56 having a flat and horizontally directed upper face. Upon the upper face of the portion 56 is received a head 58 in which a center member 60 is reciprocably received for movement in a horizontal plane. The head 58 is mounted upon the upper surface of the portion 56 for bodily shiftable movement in the direction of width of the table 26 and for pivotal movement about a vertical axis in any desired manner, the particular means shown for this purpose consisting of a bolt 62 projecting downward vertically through the head 58 and through a transverse slot 64 in the portion 56, the bolt 62 being slidable over the length of the slot 64, serving as a pivot pin between the head 58 and the portion 56, and serving to lock the head 58 in its laterally and pivotally adjusted position upon the portion 56.

The center member 60 is maintained against rotation in the head 58 by means of a guide screw 66 threaded downwardly into the head 58 and into a straight longitudinal groove 68 formed in the exterior surface of the center member 60, as brought out in Fig. 8. A sleeve 70 is threaded into the rear face of the head 58 in axial alignment with the center member 60 and contains a compression spring 72 which acts against the rear end of the center member 60 to constantly urge it outwardly or to the left as viewed in Fig. 8. Engagement of the guide screws 66 with the rear end wall of the slot 68 prevents the center member 60 from being inadvertently ejected from the head 58 under the action of the spring 72. In order to adjust the force of the spring 72 the sleeve 70 is internally provided with a suitable abutment member 74 for the rear end of the spring 72 and the position of which abutment member 74 may be varied longitudinally of the sleeve member 70 by means of a screw 76 threaded through the rear end wall of the sleeve 70 and abutting the abutment member 74. Further adjustments may be had by threading the sleeve 70 inwardly or outwardly in the head 58 and its thus adjusted position may be maintained by means of a set screw 78 threaded through the head 58 and engaging the outer surface of the sleeve 70.

The outer end of the center member 60 is bifurcated in a horizontal plane and receives therein the tongue 80 formed centrally on a center point 82, the latter of which is mounted for pivotal movement in a horizontal plane about the end of the center member 60 by means of a screw 84 passing downwardly through the bifurcated end of the center member 60 and through the tongue 80 of the point 82.

Thus with the construction of the tail stock shown and described it will be appreciated that the center member 60 is mounted for reciprocable movement in the head 58, is constantly spring pressed outwardly of the head 58, that the head 58 and consequently the center member 60 is both shiftable laterally with respect to the length of the table 26 and pivotally adjustable about a vertical axis, and that the center point 82 may be adjusted about the axis of the screw 84 to arrange its axis at any desired angle with respect to the axis of movement of the center member 60 in the head 58. It will be appreciated that the tail stock thus described may be substituted in place of the usual tail stock provided on such grinding machine, or be replaced by such conventional tail stock in an extremely quick and easy manner, usually involving only a matter of minutes.

In place of the usual driving head or head stock provided on such grinding machine the head stock shown and now described is employed in its place. This head stock includes a head proper indicated at 90, here shown by way of illustration as a cylindrically sectioned casting terminating at its bottom in an outwardly flanged flat face resting directly upon the upper surface of the table 26 at that end thereof opposite the tail stock just described. The head 90 is mounted for pivotal movement about its central vertical axis on the table 26 in any suitable or conventional manner, preferably in the same manner as the usual head stock with which the grinder is provided, the particular means shown comprising a pair of diametrically opposed radially outwardly projecting ears or lugs 92 on the flanged bottom edge thereof through each of which projects a downwardly extending bolt or screw 94 which extends down through a corresponding arcuate slot 96 in the table 26 and within the enlarged lower portion of which the bolt 94 theads into a nut 98 slidable in the slot 96, as brought out in Fig. 3. If desired and as indicated in Figs. 2 and 9 a circular scale 100 may be provided on the bottom flange of the head 90 and a cooperating pointer mark 102 may be provided on the upper surface of the table 26 to enable the rotatable position of the head 90 on the table 26 to be visually determined.

Referring now particularly to Fig. 3 it will be noted that a cylindrical holder 104 is mounted in the head 90 with its axis horizontally disposed and arranged at the same height above the upper surface of the table 26 as the center member 60. It is locked against rotation in any suitable manner, the particular means shown in the drawings for this purpose comprising a tapered shank portion 106 thereon received in the complementarily tapered opening in the head 90. Additionally, a set screw such as 107 may be threaded into the head 90 and into engaging relation to the holder 104, as shown in Fig. 5, to further lock the holder 104 against movement in the head 90. The holder 104 is provided with a cylindrical axial bore 108 within which is axially slidably received a center member 110. The center member 110 is maintained against rotation in the holder 104 by means of a guide screw 112 threaded through the side wall of the holder 104 and engaging the longitudinally extending groove 113 in the outer surface of the center member 110 as best brought out in Fig. 5. The outer or righthand end of the center member 110 as viewed in Fig. 3 is horizontally bifurcated, similarly to the outer end of the center member 60, and similarly receives therein the tail of a center point 114 which is pivotally connected thereto by means of the vertically extending screw 116 for movement in a horizontal plane. As best brought out in Figs. 3 and 7 the upper portion of the outer end of the supporting member 104 is cut away to a point inwardly spaced from the outer face of the head 90 to provide working clearance for the head of the screw 116 during axial movement of the center member 110 in the supporting member 104, and as best brought out in Fig. 6 the outer end of the opening in the head 90 in which the holder 104 is received is laterally flared, as at 117, to provide clearance for the center point 114 when the latter is swung outwardly about the axis of the pin 116 to a major extent.

The center point 114 is of substantially greater length than the center point 82 of the tail stock previously described and receives thereon the inner race of a ball bearing assembly 118 which is preferably of the type particularly adapted to take both radial and axial loads. The outer race of the bearing assembly 118 is received within the hub-like member 120 which exteriorly and concentrically supports thereon a pulley 122. A thrust bearing 124 is secured on the outer end of the center point 114 by means of a nut 126 and serves to take the thrust of the cam 160 hereafter described and to lock the inner race of the bearing 118 against axial movement on the center point 114.

A combined electric motor and gear reduction unit indicated generally at 130 is mounted upon the top face of the head 90. The unit 130 is provided with a circular base 132, the outline only of which is shown in Figs. 2 and 9 by the dash and dot lines, and is mounted for movement about a vertical axis concentric with the pivotal vertical axis of the head 90. As in the case of the head 90 while such pivotal movement of the unit 130 may be accomplished in any suitable or conventional manner, in the particular case shown the base 132 is provided with arcuate slots 134 at diametrically opposite sides thereof, indicated by dotted lines in Figs. 2 and 9 and through which clamping bolts 136 extend and which are threaded into the upper surface of the head 90.

The unit 130 is provided with a drive shaft 138 upon which a pulley 140 is non-rotatably secured and which pulley is connected by a belt 142 with the pulley 122 on the center point 114, thereby to drive the pulley 122 and hub member 120. It will be appreciated that the pivotal mounting of the unit 130 on the head 90 as above described is for the purpose of permitting the plane of the pulley 140 to be adjusted in parallelism with the plane of the pulley 122 as the latter is adjusted about the axis of the screw 116, thereby maintaining the proper driving relation between the two pulleys 122 and 140 when the center point 114 is so adjusted. It will be appreciated that inasmuch as the pulley 122 is adapted to drive the work in rotation between the center points 82 and 114 that the drive shaft 138 of the unit 130 will rotate at a relatively low rate of rotation, as for instance by way of illustration only 25 R. P. M., and that the rate of rotation of the pulley 122 with respect to the pulley 140 may be varied to accommodate different diameters of workpieces, or different characters of workpieces by varying the relative diameters of these pulleys.

As above suggested the work, here shown in the form of a reamer indicated generally at 150, is mounted between the center points 82 and 114 and is driven from the pulley 122. While any suitable form of driving connection between the reamer 150 and driving pulley 122 may be employed, a conventional form of dog indicated at 152 and arranged with its tail received in a suitable opening such as 154 in the pulley 122, constitutes a simple and conventional means for effecting such driving movement.

In order to effect the previously described reciprocable movement of the reamer 150 during rotation thereof in engagement with the grinding wheel 34 the following means is provided. The rear or lefthand end face of the hub member 120 is formed to provide a concentric axial cam indicated generally at 160. This is best brought out in Figs. 4 and 6. This cam 160 is provided with the same number of high points 162 thereon as there are teeth or cutting edges on the reamer 150 and they are angularly disposed about the axis of the center point 114 in the same angular relation as the teeth of the reamer are disposed about its axis and which, under ordinary circumstances are, of course, equally angularly spaced from each other. The holder 104, as best brought out in Fig. 7, is provided with an outwardly projecting pin 164 on its outwardly or forwardly projecting lower side and the outer end of the pin 164 is adapted to bear against the face of the cam 160. The cam 160 is constantly pressed against the pin 164 through the force of the spring 72 of the tail stock which, acting through the center member 60 and center point 82 and through the reamer 150 acts against the center point 114 to constantly and resiliently urge the cam 160 against the end of the pin 164 whenever any work such as the reamer 150 is supported between the head stock and the tail stock. The holder 104 being stationary in the head stock 90, the pin 164 is correspondingly stationary and, therefore, as the pulley 122 and consequently the work 150 and axial cam 160 rotates the cam 160 is caused to travel over the end of the pin 164. This interengagement between the pin 164 and the cam 160 causes the cam 160, the hub member 120 and, therefore, the center point 114 and center member 110, the work 150, and the pulley 122 to reciprocate axially of the center member 110 as the pulley 122 and consequently the work 150 rotates an amount equal to the distance between the high and low points of the cam measured axially of the cam.

Now as previously explained and as particularly brought out in Fig. 2, in order to translate this reciprocatory movement of the work 150 into transverse movement thereof toward and from the grinding wheel 34 in order to back off or grind a relief on the land of each cutting tooth of the reamer back of the cutting edge thereof, the tail stock and the driving head are so adjusted on the table 26 that the axes of the center members 60 and 110 are arranged in parallel relation with respect to each other but at an acute angle to the line of contact between the reamer 150 and the grinding wheel 34, and particularly at an acute angle to the line of contact between the work and the grinding wheel as viewed in a plane including the axis of the work and the line of contact between the work and the grinding wheel. Whether this angle is offset in one direction or another from such line of contact between the work and the grinding wheel will depend, of course, upon whether the reamer is a righthand or lefthand reamer and whether it is of a push type or pull type, the latter particularly where the dog 152 is to be secured to the shank of the reamer. In the present case and particularly as shown in Figs. 10 and 11 the reamer is assumed to be a righthand push type reamer having a shank 170 to which the dog 152 is secured and, therefore, the center members 60 and 110 are required to be inclined in the direction illustrated in Fig. 2, that is inclined upwardly to the right as viewed in Fig. 2. The low points of the cam 160 are in such case arranged in substantial angular alignment with the centers of the flutes between the cutting teeth of the reamer, or in slightly following relation with respect thereto, so that during rotation of the reamer the grinding wheel 34 will begin contact with the land of each tooth of the reamer back of the cutting edge of such tooth when the reamer 150 is at or adjacent the extremity of its reciprocable movement to the left as viewed in Fig. 2, and such point of contact will move radially inwardly towards the center of the reamer as the reamer rotates and reciprocates to the right as viewed in Fig. 2, to provide the desired amount of back off. The operative surface of the cam face 160 is, of course, so constructed and arranged that as soon as the grinding wheel 34 passes out of contact with the land of each tooth of the reamer being ground reciprocation of the reamer 150 to the left as viewed in Fig. 2 will occur so as to bodily withdraw the reamer 150 from the grinding wheel and position it for initial engagement with the following tooth of the reamer upon the next reversal of a reciprocatory movement of the reamer. Those surfaces of the cam 160 following the high points 162 thereof are preferably rather abrupt, as best shown in Fig. 6, so that the return movement of the reamer to the left, as viewed in Figs. 1 and 2, will be sufficiently quick to prevent contact between the grinding wheel 34 and the cutting edges of the teeth.

It will be appreciated that the particular cross-sectional contour of the backed off surface of each tooth of the reamer will depend upon the contour of the rising portions of the cam 160 approaching each high point 162 and that the particular shape of the cam rise may be varied to bet any desired form of relief or back off surface for the teeth of the reamer. In the particular shape of cam surface shown and particularly brought out in Fig. 6 the rise of each cam surface leading up to its corresponding high point 162 is along a curved line which will impart a substantially circular back off conformation back of each cutting edge of each tooth of the reamer 150, this form of back off surface being assumed to be desirable in the particular case shown. Such form of backed off surface is illustrated at 200 in Fig. 11 in greatly exaggerated amount, the teeth of the reamer 150 here being indicated at 202 and as having cutting edges 204.

It will, of course, be understood by those skilled in the art that the tables 24 and 26 will be fed back and forth longitudinally of the ways 22 to bring the desired length of the teeth of the reamer into cutting engagement with the grinding wheel 34 as the reamer 150 is rotated and simultaneously reciprocated by the mechanism above described, the wheel 134 being advanced with the slide 38 toward the work during such movement until the required amount of backed off surface, or in other words until the required width of cutting edge for each tooth of the reamer, is obtained.

The above described longitudinal movement of the tables 24 and 26 on the ways 22 will be necessary in all cases where the width of the face of the grinding wheel is less than the length of the teeth, or that portion of the teeth, being backed off. Where the length of the teeth are less than the width of the grinding wheel face, as may occur in backing off the teeth of a milling cutter, for instance, no longitudinal reciprocation of the table will obviously be required.

It will also be appreciated that where the entire cutting edges of all of the teeth of the reamer lie in a cylindrical surface, then the table 26 will preferably be arranged with its edges in parallelism to the edge of the table 24 and to the ways 22 and the center points 82 and 114 will be arranged with a line connecting their points also parallel to the path of movement of the tables 24 and 26 on the ways 22, the line of contact between the reamer and the grinding wheel 34 being parallel to such line connecting the center points in such case. However, and as best brought out in Fig. 10 it is common practice in manufacturing reamers to provide a lead end portion such as indicated at A, a main body portion such as indicated at B, and a trailing or following body portion such as indicated at C. The angularity of the portions A and C are shown in greatly exaggerated amounts for the purpose of description only. The lead portion A is of slightly frusto-conical conformation primarily to act as a guide in guiding the reamer into the work and the major cutting action occurs at or near the junction of the portions A and B. The following or trailing portion C, where provided, in turn is preferably of slightly frusto-conical conformation, usually to a less degree than the portion A, and decreasing in diameter away from the main body portion B. The portion C may be provided so as to relieve the drag which would otherwise occur when the reamer is passed through particularly a long bore which would otherwise occur if the portion C was the same diameter throughout as the portion B, and also to prevent the possibility of the sharp trailing edges of the teeth from scratching or marking the bore being reamed.

In order to utilize the mechanism thus far described in order to back off the teeth of the portions A and C of the reamer 150 the mechanism is adjusted in the manner illustrated in Fig. 9 which shows its position when adjusted for backing off the teeth of the portion A.

As illustrated in Fig. 9, to effect the backing off operation on the teeth of the reamer over the length of the lead portion A the screws 32 are loosened and the table 26 swung about the axis of the pin 28 until any tooth of the reamer 150 within the length of the portion A in contact with the grinding wheel 34 is in parallel relation with respect to the periphery of the grinding wheel 34, and then the screws 32 are tightened up to lock the table 26 in such adjusted position. This adjustment having been made then the backing off operation is carried out on the teeth of the reamer 150 over the length of the portion A in exactly the same manner as previously described in connection with backing off the teeth over the main body portion B, that is the tables 24 and 26 are caused to slide along the ways 22, the reamer 150 is caused to rotate and at the same time to reciprocate in the direction of and axially of the center members 60 and 110, and the grinding wheel 34 is fed into the work until the required amount of back off is obtained. It will be appreciated that the same general procedure is followed when backing off the teeth over the length of the portion C.

One thing to be noted is that when, for instance, the table 26 is swiveled on the table 24 as above described to back off the teeth of the reamer over the length of the portion A, the angularity of the center members 60 and 110 with respect to the line of contact between the work and the wheel is increased, as compared to that existing when backing off the cylindrical portion B, by the amount which the table 26 is thus swiveled on the table 24, and that unless the head stock and the tail stock are readjusted to re-establish the original angle employed in the backing off operation on the main body portion B between the center members 60 and 110 and the line of contact between the work and the wheel, a greater amount or degree of back off will result when the teeth over the length of the portion A of the reamer 150 are backed off. I have discovered that such increased amount or degree of back off for the teeth of the reamer over the lead end portion A is very desirable in that improved cutting qualities of the reamer are obtained and the reamer maintains its sharpness for a longer period. A reamer so constructed and arranged, that is one in which the amount of back off for the lead end portion thereof is greater than the amount of back off for the main body portion thereof forms the subject matter of my co-pending application for Letters Patent of the United States for improvement in reamers.

On the other hand, where the upper table 26 is swiveled on the lower table 24 to bring the teeth over the portion C of the reamer 150 into line contact with the periphery of the grinding wheel 34, the angularity of the axes of the center members 60 and 110 with respect to such line of contact is reduced from that existing when the table 26 is arranged for backing off of the teeth over the main body portion B, and consequently the amount of back off imparted to the teeth over the portion C will be less than that over the main body portion B unless the head stock and tail stock are re-adjusted to compensate for this reduction of angularity. However, from a practical standpoint, the taper of the portion C where provided is so slight that the difference in the amount of back off will be negligible and in any event the amount of back off of the teeth over the length of the length C of the reamer is not of great importance inasmuch as the teeth of the reamer over this portion of the length thereof are only slightly effective if at all in the removal of metal from a bore being reamed. For this reason the difference in the degree of back off thus occurring over the length of the portion C may be disregarded.

From the above it will be appreciated that in accordance with the present invention a method of backing off reamers and like circular tooth cutting elements may be accomplished in a simple, quick, and efficient manner and that by the use of the specific apparatus described any conventional universal cylindrical external grinder may be adapted to back off reamers in accordance with the present invention by simply substituting the head and tail stocks described for those conventionally employed on the grinder, which operation involves only a matter of minutes. The apparatus thus described provides means whereby conventional types of grinders may be quickly and readily adapted for backing off operations, permitting circular backing off, and without the necessity of resorting to special machinery or to difficult operations as have heretofore been necessary.

Having thus described my invention what I claim by Letters Patent is:

1. In a grinding machine of the class wherein a table is movable in a straight path relative to a grinding wheel and is relatively movable with respect thereto for effecting a transverse feeding movement between said table and said grinding wheel, the combination with said table of means for rotatably supporting a circular toothed cutting element thereon for line engagement between the teeth thereof and the operative face of said grinding wheel, means mounting said supporting means on said table for reciprocating movement in a direction at an acute angle to the line of contact between said cutting element and said grinding wheel measured in a plane including the axis of rotation of said cutting element and said line of contact and at an acute angle to the first-mentioned path of movement of said table, means for rotating said cutting element, and means for effecting reciprocation of said supporting means in timed relation with respect to said rotation of said cutting element.

2. In a grinding machine of the class wherein a table is reciprocable in a straight line relative to an associated grinding wheel and is relatively movable at right angles with respect to said wheel to vary the distance between said table and said wheel, the combination with said table of a head stock and a tail stock mounted thereon in spaced relation with respect to each other longitudinally of said table, a center member reciprocably mounted in said head stock, a center member reciprocably mounted in said tail stock, means for adjustably securing said head stock on said table to vary the angularity between the center line of said center member carried thereby with respect to the direction of movement of said table, means for adjusting the angularity between the center line of said center member of said tail stock with respect to the path of movement of said table, means constantly urging said center member of said tail stock in one direction, a center point swivelably mounted upon an end of each of said center members for the purpose of supporting a piece of work between them, means for rotating a piece of work mounted between said centers, and cam means cooperating between the last-mentioned means and said head stock for effecting longitudinal movement of said center member in said head stock in opposition to said means constantly urging said center of said tail stock in one direction in timed relation to said rotation of said rotating means.

3. In a device of the type described, in combination, a head stock, a center member axially slidably but non-rotatably mounted in said head stock, a center point member swivelably mounted on one end of said center member, a driving member rotatably mounted on said center point member, and an associated cam element and cam follower element cooperating between said head stock and driving member, one of said elements being stationary and the other being rotated by said driving member and engaging said one element, said elements being positioned between said center member and said head stock to effect axial movement of said center member in said head stock during rotation of said driving member.

4. In a device of the class described, in combination, a head stock, a center member axially slidably but non-rotatably mounted in said head stock, a center point member swivelably mounted upon one end of said center member, a driving member rotatably mounted upon said center point member and swivable therewith, an axially facing cam fixed to said driving member and rotatable therewith, means fixed with respect to said head stock in engagement with said cam whereby rotation of said driving member acts through said cam and fixed means to move said center member axially thereof.

5. In a machine for providing radial relief upon the cutting teeth of a rotary tooth cutting element of the type having circumferentially spaced teeth provided with cutting edges extending generally parallel to the axis of said element, a work supporting member for each end of said cutting element providing for rotation of said element about its axis, a metal removing member positioned for contact with the teeth of said element when supported upon said supporting members, said work supporting members being mounted for reciprocation along spaced parallel paths making acute angles with the axis of the element supported on said supporting members to provide for movement of said element toward and away from said metal removing member, means for effecting said reciprocation of said supporting members to move said element toward and away from said metal removing member and means for rotating said element about its axis in timed relation with the reciprocation of said supporting members to cause the cutting edge of a tooth in contact with said metal removing member to be rotated away from said metal removing member during reciprocatory movement of said element toward said metal removing member so as to back off the tooth in contact with said member.

6. In a machine for providing radial relief upon the cutting teeth of a rotary cutting element of the type having circumferentially spaced metal teeth provided with cutting edges extending generally parallel to the axis of said element, a work supporting member for each end of said cutting element providing for rotation of said element about its axis, a grinding wheel positioned for substantially line contact with the teeth of said element along a line substantially parallel to said axis when said element is supported upon said supporting members, said work supporting members being mounted for reciprocation along spaced parallel paths making acute angles with the axis of the element supported on said supporting members to move said element toward and away from said grinding wheel, means for effecting said reciprocation of said supporting members to move said element toward and away from said grinding wheel, and means for rotating said element about its axis in timed relation with the reciprocation of said supporting members to successively present the teeth of said element to said grinding wheel and cause the cutting edge of a tooth in contact with said grinding wheel to be rotated away from the line of contact with said grinding wheel during reciprocatory movement of said element toward said grinding wheel to back off the teeth of said element.

RUDOLF W. ANDREASSON.